July 10, 1962 P. T. McCAULEY 3,044,025

TRANSISTORIZED MODULATOR-DEMODULATOR

Filed July 13, 1959

INVENTOR.
PORTER T. McCAULEY
BY Norman Gerlach
ATTY.

3,044,025

TRANSISTORIZED MODULATOR-DEMODULATOR

Porter T. McCauley, 90 High St., Winnetka, Ill.

Filed July 13, 1959, Ser. No. 826,546
4 Claims. (Cl. 332—52)

The present invention is directed to a modulator-demodulator, and more particularly to a modulator-demodulator employing semiconductors.

In many fields of instrumentation, the problem of measuring and telemetering low level D.C. signals presents serious difficulties. Conventionally, such low level D.C. signals are measured by converting them to equivalent A.C. signals by using mechanical choppers. The mechanical choppers are, however, subject to deterioration because of metal fatigue, arcing of contacts with consequent increase in contact resistance, and other factors which cause shortened useful life. In addition, the transit time of operation of the armatures in mechanical choppers limits the switching time of mechanical choppers with consequent lowering of the switching frequency.

In the field of communication, and more particularly suppressed carrier single sideband telephony, non-linear modulators, using copper oxide rectifiers, have found wide application. Stability of modulation of such modulators may be adversely affected by temperature-induced drift. Also it is desirable to simplify the circuitry and reduce the number of components used in this type of modulator.

In all these applications, when transistors are used, random noise generated by thermal agitation causes unwanted interference with the desired output signal. The minimization or reduction of such noise is important or at least such noise should not be amplified by the transistor gain. Temperature induced-drift must also be avoided for optimum operation.

Another problem prevalent in conventional modulators is the variation in input impedance as switching occurs. It is desirable that the input impedance remain constant during signal modulation.

It is an object of the present invention to provide a novel modulator-demodulator which overcomes the deficiencies of conventional modulator-demodulators.

It is another object of the present invention to provide a novel modulator-demodulator which is free from temperature-induced drift.

It is yet another object of the present invention to provide a modulator-demodulator in which random thermal generated noise is reduced to a minimum.

It is a further object of the present invention to provide a novel modulator-demodulator which is rugged, compact and not subject to mechanical deterioration.

The present invention is directed to a half-wave modulator-demodulator in which on alternate cycles of a carrier wave the current of a modulating wave flows from a maximum to a minimum value through the primary winding of a transformer whose secondary winding provides an output for a modulated wave. A bilateral transistor in parallel with the primary winding and the input terminals of the device provides for the switching function.

A full wave modulator-demodulator, being an improvement over the half-wave modulator-demodulator, is illustrated. This latter device has the advantage of constant input and output impedance. Furthermore, with the primary or secondary windings in series opposed relationship, an alternating current signal can be developed in the output circuit for a constant polarity D.C. input signal.

The above and further objects, features and advantages of this invention will be recognized by those familiar with the art from the following description of preferred embodiments thereof, as illustrated in the accompanying drawing in which like numerals indicate like elements and in which.

Figure 1:
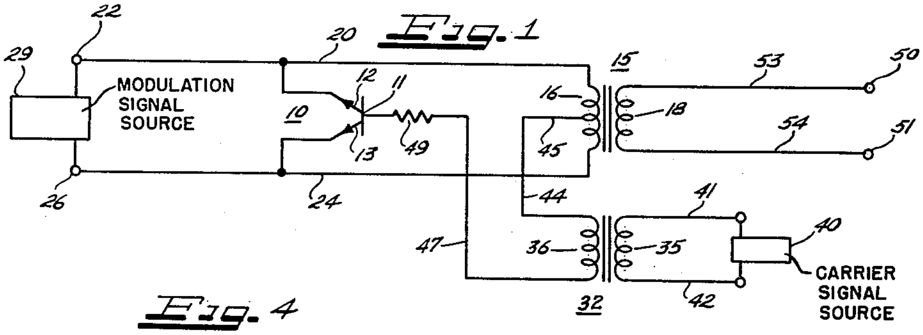
FIGURE 1 is a schematic representation of the electrical circuitry of one embodiment of the present invention.

Referring now to FIGURE 1 which sets forth an embodiment of a half wave modulator-demodulator according to the invention, there is therein shown a bilateral transistor 10 having a base electrode 11, a first electrode 12 and a second electrode 13. A bilateral transistor comprises a semi-conductor body having a base electrode, a first electrode and a second electrode in contact with said body. The transistor is a current controlled device such that bias current applied to the base and output electrodes controls the current flow across the first and second electrodes. If the transistor is current biased in a forward direction, the first and second electrodes provide a low impedance path for current flow. If the transistor is current biased in a reverse direction, the first and second electrodes provide a very high impedance to current flow. What little current flows during the reverse current biased condition is leakage current. By virtue of its bilateral characteristic, the transistor conducts current with equal facility in either direction.

A suitable bilateral transistor may, for example, be Model N. ZN596 manufactured by the General Transistor Company of Richmond Hill, New York.

The condition of very low impedance across the first and second electrode is designated as a saturated condition. When the bias current is applied with reverse polarity, the transistor presents a very high impedance across the first and second electrodes; this latter condition being designated as a cut-off condition.

A transformer 15, having a center-tapped primary winding 16 and a secondary winding 18 has one end of its primary winding 16 connected over a conductor 20 to first electrode 12 of transistor 10 and to an input terminal 22. The other end of the primary winding 16 is connected over a conductor 24 to a second input terminal 26 and to a second electrode 13 of transistor 10.

A source 29 of modulation signal is connected to the input terminals 22 and 26. The nature and origin of this modulation signal will be discussed hereinafter.

A drive transformer 32 having a primary winding 35 and a secondary winding 36 provides for the application of a carrier signal to provide bias current for transistor 10 of the half wave modulator. A source 40 of carrier signal which may be any conventional signal generator is connected to the primary winding 35 over conductors 41 and 42. In the practical embodiment, although a sine wave generator has been found adequate for source 40, a square wave generator will produce a shorter switching time from the saturated condition to the cut-off condition of the transistor.

The secondary winding 36 of transformer 32 is connected over a conductor 44 to the center-tap 45 of primary winding 16 of transformer 15 and to base 11 of transistor 10 over a conductor 47 and a drive current limiting resistor 49.

The modulated output signal from the modulator-demodulator of the invention is derived at terminals 50 and 51 which are connected to the secondary winding 18 of transformer 15 over conductors 53 and 54 respectively.

Figure 4:
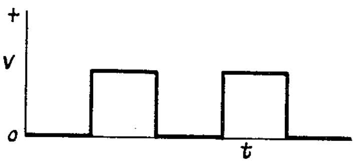
FIGURES 4 and 5 are graphical representatives of wave forms useful in explaining the operation of the preferred embodiments of the invention.

Illustrated in FIGURE 4 is a wave form showing the envelope of the modulated wave for a constant D.C. signal input. This wave form shows the plot of voltage as ordinate and time as abscissa.

The operation of the half-wave modulator-demodulator may be described with reference to the circuit hereinbefore described.

The general operation is as follows: the carrier signal from source 40 biases the transistor 10 such that on alternate cycles of carrier current the transistor 10 is cut-off and then saturated. The modulation signal from source 29 is applied to the primary winding 16 of transformer 15 only during the time transistor 10 is cut-off and causes current flow in the secondary winding 18 during that time.

Specifically, consider source 29 to comprise a thermocouple or other device which produces a D.C. voltage whose amplitude is proportional to a condition to be measured. Further in the example, it will be assumed that the D.C. voltage is constant and of such polarity that terminal 22 is positive and terminal 26 is negative. Carrier current from source 40 which may be any conventional oscillator, is applied over transformer 32 to the base 11 of transistor 10 in a manner such as to bias the transistor in a forward direction.

This condition causes transistor 10 to be driven to saturation and conduct across electrodes 12 and 13. In this condition transistor 10 presents a short circuit across conductors 20 and 24. Now, there is no current flowing through primary winding 16 due to the modulation signal from source 29, and hence no modulated signal appears at the output terminals 50 and 51.

When the carrier signal from source 40 reverses its phase, it biases the transistor 10 in a reverse direction and it appears to present a very high resistance across conductors 20 and 24. Thus, current now flows through the primary winding 16 of transformer 15 and is reflected across the output terminals 50 and 51 over secondary winding 18. Reference to the illustrated output voltage wave of FIGURE 4 shows envelope of the modulated wave for this cycle.

On the next subsequent reversal in phase of the carrier signal, the transistor 10 is again in a saturated condition and no voltage appears at output terminals 50 and 51. This alternation of bias current continues and the modulated wave appears as illustrated.

The amplitude of the modulated wave is directly proportional to the amplitude of the D.C. voltage from source 29. Since transistor 10 is bilateral, that is, it conducts current with equal facility in either direction, the polarity of the D.C. signal from source 29 may be reversed and the modulated wave will be the inverse of that shown in FIGURE 4.

Also, while the modulation system has been described for operation with a D.C. voltage, it operates equally well for an alternating voltage.

The present invention operates as well as a demodulator and its operation in this fashion follows. Assume that a modulated signal, such as that illustrated in FIGURE 4, is applied to terminals 50 and 51. Further assume that the frequency and phase of the carrier wave signal from source 40 are identical with those of the carrier wave signal which produced the modulated wave.

Under these circumstances, during the first half cycle, when transistor 10 is saturated, there is no voltage at terminals 22 and 26. During the next half cycle, when the carrier current reverses, transistor 10 is biased in a reverse direction and appears as a high resistance across conductors 20 and 24. The voltage induced across primary winding 16 from secondary winding 18 appears at terminals 22 and 26 with terminal 22 being positive and terminal 26 being negative. It is apparent that this voltage polarity remains constant.

Demodulation of an alternating current modulated wave is analogous to that thus far described for demodulation of a D.C. signal.

Figure 2:
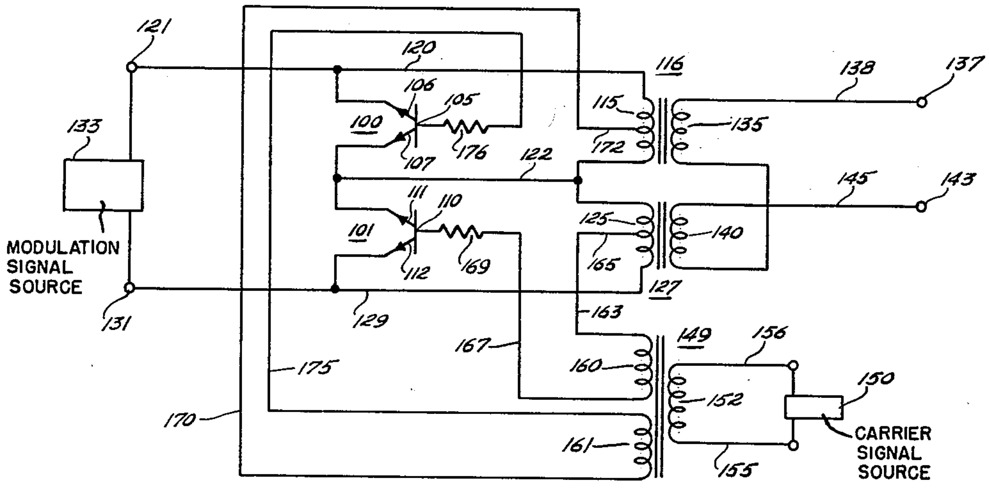
FIGURE 2 is a schematic representation of the electrical circuitry of a different embodiment of the present invention.

Having described the electrical circuitry of a half-wave modulator-demodulator, attention is now directed to FIGURE 2 whereat the circuit for a full wave modulator-demodulator is illustrated. In general, it may be noted that the circuit for a full wave device is similar to that produced by two half-wave devices arranged so that the modulating signal flows through both in series.

The circuit of FIGURE 2 comprises two bilateral transistors 100 and 101, each having a semi-conductor body and electrodes in contact therewith. Transistor 100 comprises a semi-conductor body having a base electrode 105, a first electrode 106 and a second electrode 107 in contact therewith. Transistor 101 comprises a semi-conductor body having a base electrode 110, a first electrode 111 and a second electrode 112 in contact therewith.

One end of the primary winding 115 of a transformer 116 is connected over a conductor 120 to an input terminal 121 and to first electrode 106 of transistor 100. The other end of primary winding 115 of transformer 116 is connected over a conductor 122 to the junction of the second electrode 107 of transistor 100 and the first electrode 111 of transistor 101 and to one end of the primary winding 125 of a second transformer 127. The other end of primary winding 125 of transformer 127 is connected over a conductor 129 to the second electrode 112 of transistor 101 and to a second input terminal 131. A source 133 of modulation signal is connected between input terminals 121 and 131.

Transformer 116 has a secondary winding 135, one end of which is connected to an output terminal 137 over a conductor 138, and the other end of which is connected in series opposing relationship to one end of a secondary winding 140 of transformer 127. The other end of secondary winding 140 of transformer 127 is connected to an output terminal 143 over a conductor 145.

A drive transformer 149 couples a carrier signal source 150 to the remainder of the circuit. Carrier signal source 150 is connected to a primary winding 152 of drive transformer 149 over conductors 155 and 156. Drive transformer 149 has two secondary windings 160 and 161. Secondary winding 160 of transformer 149 is connected over a conductor 163 to center tap 165 of primary winding 125 and to base electrode 110 of transistor 101 over conductor 167 and drive current limiting resistance 169. Secondary winding 161 of transformer 149 is connected over a conductor 170 to the center-tap 172 if primary winding 115 and to base electrode 105 of transistor 100 over conductor 175 and drive current limiting resistor 176.

The operation of the full wave modulator-demodulator herein shown is similar to that of the half-wave modulator-demodulator hereinbefore described in that the saturation and cut-off of the transistors 100 and 101 are utilized to perform the modulation and demodulation function. The transistors 100 and 101 are alternately saturated and cut-off such that while one is conducting across its first and second electrodes, the other is effectively an open circuit.

The action of the full wave modulation of FIGURE 2 is as follows: Assume a modulation signal of D.C. voltage of such polarity that input terminal 121 is positive and input terminal 131 is negative is produced in source 133. The transistors 100 and 101 are connected so that they are biased 180° out of phase so that a drive current applied to one transistor biases it in the forward direction and that a drive current of the opposite phase applied simultaneously to the other transistor biases it in the reverse direction. Therefore, one transistor will conduct a heavy current across its first and second electrodes and appear as a short circuit across the primary winding of its associated transformer. The other transistor conducts very little current and appears as an open circuit or very high resistance across the primary winding of its associated transformer.

During the first half cycle of the carrier current transistor 100 is biased in the forward direction and conducts a heavy current between conductors 120 and 122 and appears as a short circuit across the primary winding 115 of transformer 116. Simultaneously, the transistor 101 is biased in the reverse direction and it conducts very little current. Therefore, the voltage across terminals 122 and 129 appears across the primary winding 125 of transformer 127. A voltage is induced in the secondary winding 140 of transformer 127 and appears at terminals 137 and 143 with terminal 137 being positive and terminal 143 being negative. The secondary winding 135 of transformer 116 appears as a virtual short because of the effect of transistor 100 across its primary winding 115.

On the following half cycle of carrier current, the roles of the transistors 100 and 101 are interchanged and transistor 100 is cut off and appears as a high resistance across conductors 120 and 122, while transistor 101 is saturated and appears as a short circuit across the primary winding 125 of transformer 127. The D.C. voltage applied to terminals 121 and 131 appears across the primary winding 115 of transformer 116. This voltage is induced in secondary winding 135 of transformer 116 and appears at terminals 137 and 143. However, the voltage appearing at terminal 137 is negative polarity, while that appearing at terminal 143 is of positive polarity.

Figure 5:
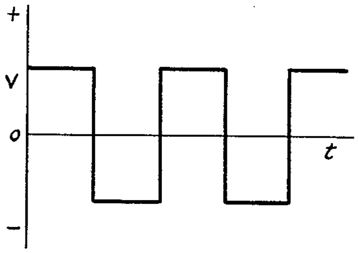

Consequently, it may be seen that an alternating voltage appears across terminals 137 and 143. This voltage signal is shown in FIGURE 5. The amplitude of this voltage is proportional to the amplitude of the D.C. voltage signal applied to the input terminals 121 and 131. Since the transistors are bilateral, that is, current can flow through them in either direction while they are conducting, a change in polarity of the input signal results in a phase reversal of the A.C. signal at the output.

In like manner an A.C. voltage may be applied to the input terminals and the output voltage will be the input A.C. signal, modulated by the carrier frequency. This latter application may be used in carrier telephony in the same manner as a suppressed carrier wave modulator.

The use of the present invention as a full wave demodulator may be explained in the following manner. Assume an A.C. signal such as that shown in FIGURE 5 is applied to terminals 137 and 143. Assume further that the phase and frequency of the carrier signal from source 150 is identical with that of the original carrier wave which was used in modulating the signal. Assume further that during the first half cycle of the carrier or driving current, the polarity of the A.C. signal across terminals 137 and 143 is such that terminal 137 is positive and terminal 143 is negative.

The carrier current from source 150 biases transistor 100 in the forward direction and it is saturated. Simultaneously, the carrier current biases transistor 101 in the reverse direction and it is cut off. The primary winding 115 of transformer 116 is short-circuited reflecting a short circuit into its secondary winding 135. The applied signal appears across secondary winding 140 of transformer 127 inducing a voltage across its primary winding 125 such that terminal 121 becomes positive and terminal 131 becomes negative.

On the following half cycle of the carrier, the signal applied to terminals 137 and 143 reverses. At the same time transistor 100 is cut off and transistor 101 is saturated because of the biasing action of the applied carrier current. Now the secondary 140 of transformer 127 appears as a short circuit because of the short circuit reflected from its primary winding 125. The voltage across secondary winding 135 of transformer 116 is of such polarity that the voltage induced in its primary winding 115 is positive at conductor 120 and negative at conductor 122. Therefore the polarity of the voltage across terminals 121 and 131 remains the same as that in the previous half cycle. Thus, the original polarity of the signal as sent through the modulator is recovered again at terminals 121 and 131 when this device is used as a demodulator.

Figure 3:
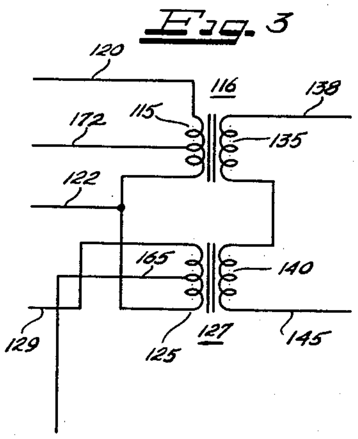
FIGURE 3 is a schematic representation of a modification of the embodiment of FIGURE 2.

Reference may now be had to FIGURE 3 in which is shown a portion to FIGURE 2 with like numerals indicating like elements in the figures. The remainder of FIGURE 3 is identical to that of FIGURE 2. The difference between these two figures lies in the fact that in FIGURE 2 the primary windings 115 and 125 are connected in series aiding relationship and the secondary windings 135 and 140 are connected in series opposing relationship. In FIGURE 3 the reverse connections of transformer windings are made.

The manner of operation of the embodiment of FIGURE 3 is analogous to that discussed in detail with regard to the embodiment of FIGURE 2. The purpose of transposing either the primary or secondary winding connections is to ensure the proper polarity of the demodulated signal when the embodiment of FIGURE 2 or FIGURE 3 is used.

The application of an A.C. signal to terminals 137 and 143 causes the circuit to operate in an analogous manner and an A.C. modulated voltage wave will be demodulated in the same manner.

While the following remarks apply to the full wave modulator-demodulator, they are equally applicable to the half-wave circuit.

Although a transistor which is biased in a reverse direction appears as a high resistance, nevertheless a small amount of cut-off current flows between the base and each of the other electrodes. It will be seen that cut-off current flowing from base 105 of transistor 100 through electrode 106 flows over conductor 120 and the upper half of the primary winding 115 of transformer 116 and over conductor 122. Simultaneously cut-off current flowing from base 105 through electrode 107 flows over conductor 122 and the lower half of the primary winding 115 of transformer 116. A similar analysis can be made of the cut-off current in transistor 101. In this manner the cut-off currents between the base and the electrodes of each transistor flow in opposite directions through the primary halves of its respective transformer and cancel one another out to the extent that they are of the same magnitude. This effect reduces noise in the output signal.

Any variation in cut-off currents because of temperature variations are likewise cancelled out since temperature variations affect the junctions substantially equally in the same transistor. The device is therefore virtually free from temperature-induced drift.

As may be seen from the embodiments herein shown, base drive current flows in both electrodes of each transistor and cancel out in the primary winding of the transformer associated with each transistor. Therefore again temperature-induced variations which would be otherwise present are eliminated in the present invention.

The present invention suppresses random thermal noise generated in the transistors by causing cancellation of this thermal current in the primary winding of the transformers. Thermal or Johnson noise in both junctions of a transistor which is forward biased and saturated is generated by a very low resistance. Thermal or Johnson noise generated in both junctions of a transistor which is biased in the reverse direction is generated by a high resistance. In phase elements of this noise are cancelled in the transformers.

With regard to modulation and demodulation of applied signals, the transistors chosen should preferably have a high alpha cut-off frequency. With this presently available components, a switching frequency of 25,000 cycles per second is entirely practical.

In summary there has been illustrated and described a novel modulator-demodulator either half-wave or full wave operation. The saturation or cut-off of a transistor or transistors by a carrier drive signal causes modulation or demodulation in the manner explained. Either D.C. or A.C. signals can be modulated with equal facility. The freedom of the invention from thermal noise, temperature-induced drift and its simplicity of construction represent distinct advances in the art.

While specific embodiments of the present invention have been illustrated and described, other modification, rearrangements and changes will occur to those skilled in the art without departing from the scope of the present invention as defined by the appended claims.

Having thus described the invention what I claim as new and desire to secure by Letters Patent is:

1. An amplitude modulation system for producing a modulated wave comprising a pair of semi-conductor bodies each including a base electrode, a first electrode and a second electrode in contact with said body, a pair of transformers, each including a center-tapped primary winding and a secondary winding, a first input terminal, means connecting said first input terminal to said first electrode of one of said semi-conductor bodies and to one end of one of said primary windings, a second input terminal, means connecting said second input terminal to said second electrode of said other of said pair of semi-conductor bodies and to one end of the other of said primary windings, conductor means connecting said second electrode of said one of said semi-conductor bodies to said first electrode of said other of said semi-conductor bodies, conductor means connecting said last- mentioned means to the other ends of each of said primary windings, a third transformer having a pair of secondary windings and a primary winding, each of said secondary windings of said third transformer being connected between the base electrode of one of said semi-conducting bodies and the center tap of a corresponding one of said pair of transformers, conductor means connected to said primary winding of said third transformer for applying thereto a carrier wave, means for connecting said secondary windings of said pair of transformers in series opposing relationship, and output terminal means connected to the free ends of said secondary windings of said pair of transformers to receive therefrom said modulated wave.

2. An amplitude modulation system for producing a modulated wave in accordance with claim 1 in which each of said semi-conductor bodies is a bilateral switching transistor.

3. An amplitude modulation system for producing a modulated wave in accordance with claim 1 in which said primary windings of said pair of transformers is connected in series opposing relationship and said secondary windings of said input transformers connected in series aiding relationship.

4. An amplitude modulation system for producing a modulated wave comprising a pair of input transformers each having a primary winding and a secondary winding, said primary windings being connected in series, a pair of bilateral transistors each having a pair of electrodes and a base electrode, means connecting each of said transistors in shunt across a corresponding one of said primary windings, conductor means connected to the free ends of said primary windings and to one electrode of each transistor, input terminals connected to said conductor means for applying thereto an unmodulated signal, means for deriving a pair of carrier waves of opposing phase, conductor means connected to said base of one of said transistors and to the center-tap of said corresponding primary winding for applying thereto one of said carrier waves, conductor means connected to said base of said other transistor and to the center-tap of said corresponding primary winding for applying thereto the other of said pair of carrier waves and output terminals connected to the free ends of said secondary windings of said input transformers for deriving therefrom said modulated wave.

References Cited in the file of this patent

UNITED STATES PATENTS

| | | |
|---|---|---|
| 2,862,171 | Freeborn | Nov. 25, 1958 |
| 2,943,271 | Willis | June 28, 1960 |